US012393185B2

(12) United States Patent
Walzenbach et al.

(10) Patent No.: US 12,393,185 B2
(45) Date of Patent: Aug. 19, 2025

(54) METHOD FOR MONITORING AND/OR CONTROLLING ONE OR MORE CHEMICAL PLANT(S)

(71) Applicant: BASF SE, Ludwigshafen (DE)

(72) Inventors: Alexander Walzenbach, Ludwigshafen (DE); Marco Klaus Jaeger, Ludwigshafen (DE); Jan Buck, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 18/742,315

(22) Filed: Jun. 13, 2024

(65) Prior Publication Data
US 2024/0402694 A1   Dec. 5, 2024

Related U.S. Application Data

(63) Continuation of application No. 17/781,392, filed as application No. PCT/EP2020/085130 on Dec. 8, 2020.

(30) Foreign Application Priority Data

Dec. 13, 2019 (EP) ..................................... 19216144

(51) Int. Cl.
G05B 19/418    (2006.01)
G05B 23/02     (2006.01)

(52) U.S. Cl.
CPC ... *G05B 19/41885* (2013.01); *G05B 19/4183* (2013.01); *G05B 19/4185* (2013.01); *G05B 23/0297* (2013.01); *G05B 2219/33099* (2013.01)

(58) Field of Classification Search
CPC .......... G05B 19/41885; G05B 19/4185; G05B 23/0297; G05B 2219/33099
See application file for complete search history.

(56) References Cited

U.S. PATENT DOCUMENTS

2014/0047107 A1* 2/2014 Maturana ............. G05B 19/056
                                                   709/224
2015/0134733 A1   5/2015 Maturana et al.
(Continued)

FOREIGN PATENT DOCUMENTS

CN    104636421 A    5/2015
CN    104871097 A    8/2015
(Continued)

OTHER PUBLICATIONS

International Application No. PCT/EP2020/085130, International Search Report and Written Opinion mailed Feb. 12, 2021.
(Continued)

*Primary Examiner* — Thomas Randazzo
(74) *Attorney, Agent, or Firm* — Lowenstein Sandler LLP

(57) ABSTRACT

Disclosed is a method for monitoring and/or controlling a chemical plant (12) with multiple assets via a distributed computing system (10) with more than two deployment layers (14, 16, 30, 32, 34), wherein the deployment layers (14, 16, 30, 32, 34) comprise at least two of a first processing layer (14), a second processing layer (16, 32, 34) and an external processing layer (30), the method comprising the steps of:
   providing (60) a containerized application (48, 50) including an asset or plant template specifying input data, output data and an asset or plant model,
   deploying (62) the containerized application (48, 50) to execute on at least one of the deployment layers (14, 16, 30, 32, 34), wherein the deployment layer (14, 16, 30, 32, 34) is assigned based on the input data, a load indicator, or a system layer tag, and executing the containerized application (46, 52, 54) on the assigned deployment layer(s) (14, 16, 30, 32, 34) to generate output data for controlling and/or monitoring the chemical plant (12), (Continued)

providing (66) the generated output data for controlling and/or monitoring the chemical plant (12).

15 Claims, 8 Drawing Sheets

(56) References Cited

U.S. PATENT DOCUMENTS

| | | | |
|---|---|---|---|
| 2015/0277429 A1 | 10/2015 | Drath et al. | |
| 2016/0320768 A1 | 11/2016 | Zhao et al. | |
| 2017/0192414 A1* | 7/2017 | Mukkamala | H04L 43/045 |
| 2019/0041824 A1* | 2/2019 | Chavez | G06F 11/2023 |
| 2019/0058627 A1* | 2/2019 | Collins | H04L 41/0613 |
| 2019/0369984 A1* | 12/2019 | Malladi | G06F 8/70 |
| 2020/0182036 A1* | 6/2020 | Rangarajan | G06N 3/08 |
| 2021/0096553 A1* | 4/2021 | Stump | G05B 19/40937 |

FOREIGN PATENT DOCUMENTS

| | | |
|---|---|---|
| CN | 107864222 A | 3/2018 |
| JP | 2018535480 A | 11/2018 |
| WO | 2016065493 A1 | 5/2016 |
| WO | 2019138120 A1 | 7/2019 |

OTHER PUBLICATIONS

Technology Blogs by SAP, "Practical Industrial IoT Security: SAP's Digital Manufacturing Landscape", Jan. 30, 2018, 17 pages.

Microsoft Azure Product Catalog; An open cloud platform allowing you to use unlimited servers and storage as much as you need, when you need it, Nikkei xTECH EXPO 2018, Japan, Oct. 17, 2018, 21 pages with English translation.

Office Action with English Translation for Japanese Patent Application No. 2022-535736 dated Dec. 24, 2024, 11 pages.

* cited by examiner

METHOD FOR MONITORING AND/OR CONTROLLING ONE OR MORE CHEMICAL PLANT(S)

CROSS REFERENCE TO RELATED APPLICATION(S)

The present application is a continuation application of U.S. patent application Ser. No. 17/781,392 filed on Jun. 1, 2022, which is a national stage entry under 35 U.S.C. 371 of International Application No. PCT/EP2020/085130 filed on Dec. 8, 2020, which claims priority to European patent application No. 19216144.6 filed on Dec. 13, 2019. The entire contents of which are incorporated herein in their entirety.

FIELD

The disclosure relates to a method for monitoring and/or controlling a chemical plant with multiple assets via a distributed computing system with multiple deployment layers.

BACKGROUND

Chemical production is a highly sensitive production environment particularly with respect to safety. Chemical plants typically include multiple assets to produce the chemical product. Multiple sensors are distributed in such plants for monitoring and control purposes and collect masses of data. As such chemical production is a data heavy environment. However, to date the gain from such data to increase production efficiency in one or multiple chemical plants has not been fully leveraged.

Applying new technologies in cloud computing and big data analytics is hence of great interest. Unlike other manufacturing industries, however, process industry is subject to very high safety standards. For this reason, computing infrastructures are typically siloed with highly restrictive access to monitoring and control systems. Owing to such safety standards, latency and availability considerations contravene a simple migration of to date embedded control systems to e.g. a cloud computing system. Bridging the gap between highly proprietary industrial manufacturing systems and cloud technologies is one of the major challenges.

WO2016065493 discloses a client device and a system for data acquisition and pre-processing of process-related mass data from at least one CNC machine or an industrial robot and for transmitting said process-related data to at least one data recipient, e.g. a cloud-based server is described. The client device comprises at least one first data communication interface to at least one controller of the CNC machine or industrial robot, for continuously recording hard-realtime process-related data via at least one realtime data channel, and for recording non-realtime process-related data via at least one non-realtime data channel. The client device further comprises at least one data processing unit data-mapping at least the recorded non-realtime data to the recorded hard-realtime data to aggregate a contextualized set of process-related data. Moreover, the client device comprises at least one second data interface for transmitting the contextualized set of process-related data to the data recipient and for further data communication with the data recipient.

WO2019138120 discloses a method for improving a chemical production process. A plurality of derivative chemical products are produced through a derivative chemical production process based on at least some derivative process parameters at a respective chemical production facility, which chemical production facilities each comprises a separate respective facility intranet. At least some respective derivative process parameters are measured from the derivative chemical production process by a respective production sensor computer system within each facility intranet. A process model for simulating the derivative chemical production process is recorded in a process model management computer system outside the facility intranets.

US20160320768A1 discloses an example network environment for monitoring plant processes with system computers operating as a root-cause analyzer. The system computers communicate with the data server to access collected data for measurable process variables from a historian database. The data server is communicatively coupled to a distributed control system (DCS) in turn communicating collected data to the data server over communications network.

The object of the present invention relates to a highly scalable and flexible method for monitoring and/or controlling chemical plants in process industry, which adheres to the high safety standards and allows for enhanced monitoring or controlling.

SUMMARY

A method for monitoring and/or controlling a chemical plant with multiple assets via a distributed computing system with more than two deployment layers is proposed. The deployment layers comprise at least two of a first processing layer, a second processing layer and an external processing layer. The method comprises the steps of:
providing a containerized application including an asset or plant template specifying input data, output data and an asset or plant model,
deploying the containerized application to execute on at least one of the deployment layers, wherein the assignment of the deployment layer depends on the input data, a load indicator, or a system layer tag, and executing the containerized application on the respective deployment layer to generate output data for controlling and/or monitoring the chemical plant,
providing the generated output data for controlling and/or monitoring the chemical plant.

A system for monitoring and/or controlling a chemical plant with multiple assets with more than two deployment layers is proposed, wherein the deployment layers comprise at least two of a first processing layer, a second processing layer and an external processing layer, the system being configured to:
provide a containerized application including an asset or plant template specifying input data, output data and an asset or plant model,
deploy the containerized application to execute on at least one of the deployment layers, wherein the deployment layer is assigned based on the input data, a load indicator, or a system layer tag, and executing the containerized application on the assigned deployment layer(s) to generate output data for controlling and/or monitoring the chemical plant,
provide the generated output data for controlling and/or monitoring the chemical plant.

The present invention further relates to a distributed computer program or computer program product with computer-readable instructions that, when executed on one or more processor(s), cause the processor(s) to perform the methods for monitoring and/or controlling one or more chemical plant(s) as described herein. The invention further relates to a computer readable non-volatile or non-transitory storage medium with computer-readable instructions that, when executed on one or more a processor(s), cause the processor(s) to perform the methods for monitoring and/or controlling one or more chemical plant(s) as described herein.

The proposed method allows for highly efficient application handling in a distributed computing system controlling and/or monitoring chemical plants. By introducing different process and storage layers, the mass data transfer, orchestration and execution of applications can be distributed over different layers allowing for flexible application handling. Moreover, the concept of three system layers allows for highly available and secure monitoring and/or controlling, since the second processing and the external management layer are redundant. In other words, more critical tasks may be assigned to on premise computing resources not relying on an external network, while less critical tasks may be assigned to external computing resources. An additional advantage is that based on the context the method enables an automation for the deployment of applications and the automatic identification of needs for retro-fit of additional sensors or IOT sensors.

Additionally, the proposed method can accommodate multiple chemical plants via the second processing layer or the external processing layer. Hence the method enables a highly scalable application orchestration for more reliable and enhanced monitoring and/or controlling of chemical plants. In particular, orchestration of containerized application in a diverse application landscape can be organized to adhere to the specific needs of process industry. For instance, the deployment of containerized applications ingesting input data can be streamlined for multiple assets even in multiple plants. Additionally, depending on the specific data required by the containerized application and the computing resources required to run such applications, the appropriate processing layer may be chosen, thus adhering to high availability standards in chemical plants. For instance, computationally heavy applications ingesting plant specific may be executed on the second processing layer, while process applications ingesting asset or process specific data and requiring low latency may be executed on the first processing layer. Further criteria when to orchestrate on which deployment layer may be defined.

The following description relates to the system, the method, the computer program, the computer readable storage medium lined out above. In particular the systems, the input units, the computer programs and the computer readable storage media are configured to perform the method steps as set out above and further described below.

In the context of the present invention chemical plant refers to any manufacturing facility based on chemical processes, e.g. transforming a feedstock to a product using chemical processes. In contrast to discrete manufacturing, chemical manufacturing is based on continuous or batch processes. As such monitoring and/or controlling of chemical plants is time dependent and hence based on large time series data sets. A chemical plant may include more than 1.000 sensors producing measurement data points every couple of seconds. Such dimensions result in multiple terabytes of data to be handled in a system for controlling and/or monitoring chemical plants. A small-scale chemical plant may include a couple of thousand sensors producing data points every 1 to 10 s. For comparison a large-scale chemical plant may include a couple of ten-thousand sensors, e.g. 10.000 to 30.000, producing data points every 1 to 10 s. Contextualizing such data results in the handling of multiple hundred gigabytes to multiple terabytes.

Chemical plants may produce a product via one or more chemical processes transforming the feedstock via one or more intermediate products to the product. Preferably a chemical plant provides an encapsulated facility producing a product, that may be used as feedstock for the next steps in the value chain. Chemical plants may be large-scale plants like oil and gas facilities, gas cleaning plants, carbon dioxide capture facilities, liquefied natural gas (LNG) plants, oil refineries, petro-chemical facilities or chemical facilities. Upstream chemical plants in petrochemicals process production for example include a steamcracker starting with naphtha being processed to ethylene and propylene. These upstream products may then be provided to further chemical plants to derive downstream products such as polyethylene or polypropylene, which may again serve as feedstock for chemical plants deriving further downstream products. Chemical plants may be used to manufacture discrete products. In one example one chemical plant may be used to manufacture precursors for polyurethane foam. Such precursors may be provided to a second chemical plant for the manufacture of discrete products, such as an isolation plate comprising polyurethane foam.

The value chain production via various intermediate products to an end product can be decentralized in various locations or integrated in a Verbund site or a chemical park. Such Verbund sites or chemical parks comprise a network of interconnected chemical plants, where products manufactured in one plant can serve as a feedstock for another plant.

Chemical plants may include multiple assets, such as heat exchangers, reactors, pumps, pipes, distillation or absorption columns to name a few of them. In chemical plants some assets may be critical. Critical assets are those, which when disrupted critically impact plant operation. This can lead to manufacturing processes being compromised. Reduced product quality or even manufacturing stops may the result. In the worst-case scenario fire, explosion or toxic gas release may be the result of such disruption. Hence such critical assets may require more rigorous monitoring and/or controlling then other assets depending on the chemical processes and the chemicals involved. To monitor and/or control chemical processes and assets multiple actors and sensors may be embedded in the chemical plant. Such actors or sensors may provide process or asset specific data relating to e.g. the state of an individual asset, the state of an individual actor, the composition of a chemical, or the state of a chemical process. In particular, process or asset specific data include one or more of the following data categories:
process operation data, such as composition of a feedstock or an intermediate product,
process monitoring data, such as flow, material temperature,
asset operation data, such as current, voltage, and
asset monitoring data, such as asset temperature, asset pressure, vibrations.

In the context of the present disclosure assets may include any component of the chemical plant, such as equipment, instrumentation, machine, process or process component. Hence, an asset model may relate to a machine, equipment, instrumentation, process or process component model.

Process or asset specific data refers to data relating to a specific asset or process and contextualized with respect to such specific asset or process. Process or asset specific data may be contextualized only with respect to individual assets and processes. Process or asset specific data may include measurement value, data quality measure, time, measurement unit, asset identifier for specific assets or process identifier for a specific process sections or stages. Such process or asset specific data may be collected on the lowest processing layer or the first processing layer and contextualized with respect to specific assets or processes in a single plant. Such contextualization may relate to context available on the first processing layer. Such context may relate to a single plant.

Plant specific data refers to process or asset specific data that is contextualized with respect to one or more plant(s). Such plant specific data may be collected on the second processing layer and contextualized with respect to multiple plants. Specifically, contextualization may relate to context available on the second processing layer. Via contextualization context such as plant identifier, plant type, reliability indicator, or alarm limits for the plant may be added to process or asset specific data points. In a further step technical asset structure of one or more plant(s), a Verbund site or a chemical park, other asset management structure (e.g. asset network), or application context (e.g. model identifier, third party exchange) may be added. Such overarching context can originate from functional locations or digital twins, such as digital piping and instrumentation diagrams, 3D models or scans with xyz coordinates of the plant assets. Additionally or alternatively local scans from mobile devices linked to e.g. piping and instrumentation diagrams may be used for contextualization.

In particular, plant specific data relating to interfaces between chemical plants in a manufacturing chain may be provided on the second processing layer or the external processing layer. Thus, monitoring and/or controlling, e.g. via anomaly detection, setpoint steering and optimization in chains across multiple plants, can be enhanced. For monitoring and/or controlling the chain across multiple plants process applications with online in/out data profiles may be used. Such data and process applications may be transferred between plants. Combined with mass and energy balances that can be monitored, such process applications may optimize the full chain across chemical plants rather than individual plants in the chain The process of contextualization refers to linking data points available in one or more storage unit(s). Such unit(s) may be persistent or non-volatile storage. Data points may relate to measurement values or context information. Storage unit(s) may be part of the first processing layer, the second processing layer, the external processing layer or distributed across two or more of those layers. The linking may be generated dynamically or statically. E.g. pre-defined or dynamically generated scripts may generate dynamic or static links between information data points in one processing layer or across processing layers. Links may be established by generating a new data object including the linked data itself and storing such new data object in a new instance. Any data point stored may be actively deleted, if a copy is stored elsewhere. Any data point thus copied from one storage unit to a new data object in the same or another storage unit may be deleted to reduce storage space. Additionally, or alternatively links may be established by generating a meta data object with embedded links to address or access respective data points in distributed storage unit(s). Any data point thus addressable or accessible through the meta data object may remain in its original storage unit. Linking such information to form a new data object may still be performed e.g. on the external processing layer. For the retrieval of data either data objects are accessed directly or meta data objects are used to address or access the data distributed in one or more storage unit(s). Any operations on such data such as applications may either access such data directly, may access a non-persistent image of such data, e.g. from cache memory, or a persistent copy of the data.

In the present context a containerized application refers to a process application which may be executed in an encapsulated runtime environment independent of a host's operating system. The application may hence be viewed to run in a sandbox. The containerized application may be based on a container image containing the application. The container image may include software components, e.g. hierarchical tree of software components, required to execute the respective application in an encapsulated runtime environment. Such containerized application may be stored in a registry of or associated with the second processing layer or the external processing layer.

To deploy a containerized application an orchestration application associated with the second processing layer or the external processing layer may manage execution of the containerized application. Such management may include general runtime environment configurations such as storage or network to run the containerized application. Such management may further include a host assignment defining a central master node or a distribution among one or more computing node(s) to execute the application on the first processing layer, the second processing layer or the external management layer. In particular such assignment of computing resources depends on the input data, the load indicator, or the system layer tag.

The input data may include real time data from sensors, such as wireless monitoring devices or IoT devices, non-real time data, or output data of deployed containers or executed applications. Such data may relate to machinery, such as machinery type or sensor data measured with respect to the machinery, chemicals, such as chemicals type or sensor data measured with respect to chemical components processed in the chemical plant, processes, such as chemical process type or sensor data measured with respect to the chemical processes performed in the chemical plant, and/or plant, such as plant type or sensor data measured with respect to the chemical plant, e.g. environmental measurement data.

The asset or plant model may include a data-driven or a kinetic model providing e.g. a health status, an operation forecast, an event forecast or an event trigger. The asset or plant model may be based on a mere data-driven model, a hybrid model combining data-driven and kinetic models or a mere kinetic model. The asset or plant model may further be based on a scenario matrix mapping input data, e.g. sensor data, to specific events. The asset model may reflect the physical behavior of a single or multiple asset(s). The plant model may reflect the physical behavior of parts of one or more plant(s), a full plant or multiple plants.

The output data may include key performance indicators relating to the asset, the plant, the input data, an asset model performance or a plant model performance. Asset model performance or a plant model performance may be embedded in the asset or plant model hosted by the containerized application. Any generated output data of the method may be used in a one or more further containerized applications as input data. This way chains of containerized applications may be realized to build a system of system coverage and use the generated output data for controlling and/or monitoring one or multiple chemical plants. Such chemical plant may be parallel manufacturing plant or plants connected along the value chain.

The containerized application may include one or more operations to ingest input data, provide the input data to respective asset or plant models to generate output data and to provide the generated output data for controlling and/or monitoring the chemical plant. Such output data may be passed to a persistent instance after execution of the application. In particular such output data may be passed to a controlling instance, e.g. on the first processing layer of the chemical plant. Additionally or alternatively such output data may be passed to a monitoring instance on the first processing layer, the second processing layer or the external processing layer. The output data may be passed to e.g. a client application for display to an operator or a further containerized application for execution.

In one aspect the second processing layer includes larger storage and computing resources than the first processing layer. Alternatively or additionally the external processing layer may include larger storage and computing resources than the second processing layer. Such stacked resource structure aids to bridge the gap between embedded control systems of chemical plants and available cloud technologies. In particular, embedded control systems of chemical plants are limited in storage and processing capabilities. Extending such resources allows for enhanced monitoring and/or control.

The first and the second processing layer may be hosted, situated, configured in or inside a secure network. The first processing layer may be communicatively coupled to the second processing layer. The first processing layer may include at least one core process system associated with the chemical plant or a single chemical plant. Preferably the first processing layer is configured to control and/or monitor chemical processes and assets on the asset level in individual plants. Hence the first processing layer monitors and/or controls the chemical plant on the lowest level. Further preferred the first processing layer is configured to monitor and control critical assets. Critical assets refer to those assets, which when disrupted critically impact plant operation. This can lead to manufacturing processes being compromised. Reduced product quality or even manufacturing stops may be the result. In the worst-case scenario fire, explosion or toxic gas release may be the result of such disruption. Hence such critical assets may require more rigorous monitoring and/or controlling then other assets depending on the chemical processes and the chemicals involved.

Additionally or alternatively the second processing layer may be configured to provide data to an external network e.g. via an interface to an external network. The second processing layer may be communicatively coupled to an external processing layer via an external network. Adding stacked processing layers in or inside the secure network allows to comply with high safety standards in chemical industry. In particular such architecture allows the method of being performed fully independent of the external management layer enabling an island mode for one or more chemical plants. Here an island mode refers to monitoring and/or controlling of chemical plants without access to an external network.

In a further aspect the first processing layer is configured to provide asset or process specific data and the second processing layer is configured to provide plant specific data. The second processing layer may be configured to contextualize asset or process specific data. This way the performance of the first processing layer is not affected. Since typical core process systems of the first processing layer particularly in older plants do not have the required computing power, adding a further system with higher performance even enables contextualization. Additionally the second processing layer allows for data contextualization on a plant level rather than an asset level. Data contextualization in the present context relates to adding context information to asset or process specific data or to reducing the data size by pre-processing asset or process specific data. Adding context may include adding further information tag(s) to the asset or process specific data. Pre-processing may include filtering, aggregating, normalizing, averaging, or inference of asset or process specific data.

In one aspect the first processing layer is associated with one or a single chemical plant. The first processing layer may be a core process system including one or more processing devices and storage devices. Such layer may include one or more distributed processing and storage devices forming a programmable logic controller (PLC) system or decentralized control system (DCS) with control loops distributed throughout the chemical plant. Preferably the first processing layer is configured to control and/or monitor chemical processes and assets on the asset level. Hence the first processing layer monitors and/or controls the chemical plant on the lowest level. Furthermore, the first processing layer may be configured to monitor and control critical assets. Additionally or alternatively, the first processing layer is configured to provide process or asset specific data to the second processing layer. Such data may be provided directly or indirectly to the second processing layer.

In a further aspect the second processing layer is associated with more than one chemical plant. The second processing layer may include a process management system with one or more processing and storage devices. Preferred the second processing layer or the process management system is configured to manage data transfer to and/or from the first processing layer. Further preferred the second processing layer or the process management system is configured to host and/or orchestrate process applications. Such process applications may monitor and/or control one or more chemical plant(s) or one or more asset(s). The process management system may be associated with one or more chemical plants. In other words, the process management system may be communicatively coupled to multiple first processing layers associated with one or more chemical plant(s).

In a further aspect the second processing layer may comprise an intermediate processing system and a process management system. Here the intermediate processing system may be communicatively coupled to the first processing layer, preferably the core process system, and the process management system may be communicatively coupled to the intermediate layer. Preferably the first processing layer and the process management system are coupled or communicatively coupled via the intermediate processing system. The intermediate processing system may be configured to collect process or asset specific data provided by the first processing layer. The process management system may be configured to provide plant specific data of one or more chemical plant(s) to the interface to the external network. The intermediate processing system may be associated with one or more chemical plants. In other words, the intermediate processing system may be communicatively coupled to first processing layer of one chemical plant or to multiple first processing layers of multiple plants. The process management system may be communicatively coupled to one or multiple intermediate processing systems. Adding the intermediate processing level to the second processing layer adds a further security layer. It fully detangles the virulent first processing layer from any external network access. Additionally, the intermediate level allows for more enhanced data handling by reducing data transfer rates to the external processing layer via pre-processing and enhancing data quality by contextualization. The intermediate processing system and process management system may comprise one or more processing and storage devices.

In a further aspect the secure network is a segregated network including more than two security zones separated by firewalls. Such firewalls may be network or host-based virtual or physical firewalls. The firewall may be hardware- or software-based to control incoming and outgoing network traffic. Here predetermined rules in the sense of a white listing may define allowed traffic via access management or other configuration settings. Depending on the firewall configuration the security zones may adhere to different security standards.

In a further aspect the first processing layer is hosted, situated or configured in or inside a first security zone via a first firewall and the second processing layer is hosted, situated or configured in or inside a second security zone via a second firewall. To securely protect the first processing layer, the first security level may adhere to a higher security standard than the second security level. Security levels may adhere to a common industry standard such as lined out in Namur documentation IEC 62443. The second processing layer may provide further segregation via security zones. For example, the intermediate processing system may be hosted, situated or configured in or inside a third security zone via a third firewall and the process management system may be configured in the second security zone via the second firewall. The third and second security zones may be staggered in terms of security standard as well. For instance the third may adhere to a security standard higher than the second. This allows for higher security standards on the lower security zone of the first processing layer and lower security standards on higher security zones of the second processing layer. In one embodiment the first processing layer is inside a first security zone, the process management system is inside the second security zone and the intermediate processing system is inside a third security zone.

The second processing layer may be configured to contextualize process or asset specific data. This way the performance of the first processing layer is not affected. Since typical core process systems in older plants do not have the required computing power, adding a further system with higher performance even enables contextualization. Additionally the second processing layer and in particular the intermediate processing system allows for data contextualization on a plant level rather than an asset level. Data contextualization in the present context relates to adding context information to process or asset specific data or to reducing the data size by pre-processing process or asset specific data. Adding context may include adding further information tag(s) to the process or asset specific data. Pre-processing may include filtering, aggregating, normalizing, averaging, or inference of process or asset specific data.

In further aspect unidirectional or bidirectional communication, e.g. data transfer or data access, may be realized for data streams between different processing layers. In other words the system may be configured to allow for unidirectional or bidirectional communication, e.g. data transfer or data access between different processing layers. One data stream may include process or asset specific data from the first processing layer being passed to and contextualized via the second processing layer and communicated to the external processing layer. Contextualization may be performed on the second processing layer, the external processing layer or both. In other words, the second processing layer, the external processing layer or both may be configured to contextualize process or asset specific data or plant specific data. Furthermore, depending on criticality of the process or asset specific data or the plant specific data such data may be assigned for unidirectional or bidirectional communication. In other words, the system may be configured to assign unidirectional or bidirectional communication to process or asset specific data or the plant specific data depending on criticality of the process or asset specific data or the plant specific data. E.g. data communication from the second or external processing layers to critical assets may be prohibited by realizing a diode type communication channel. Such communication may only allow for unidirectional communication from the critical asset to the processing layers but not vice versa.

In further aspect data streams may be assigned critical or non-critical data. In other words, the system may be configured to assign critical or non-critical data tags. Critical data refers to data that is critical to operate the chemical plant, such as short-term data, from which operation points of the chemical plant are derived. Such critical data may cover a short term horizon of, e.g. hours or days up one or more week(s), which is required to operate the plant in its optimal state. Non-critical data refers to data that is not critical to operate the chemical plant, such as mid- to long-term data for monitoring the chemical plant based on mid- to long-term behavior. Such non-critical data may cover a mid- to long-term time horizon, e.g. multiple weeks or months up to one or more year(s), which is required to monitor and/or control asset(s) or plant(s) e.g. over a time span. Such data may also be referred to as cold, warm and hot data, wherein the hot data corresponds to critical data, the warm data corresponds to mid-term non-critical data and cold data corresponds to long-term non-critical data.

In a further aspect data contextualization is staggered across system layers, processing layers or processing systems included in such processing layers with each layer mapping context information available in the respective layer. In other words, the system may be configured to stagger data contextualization across system layers, processing layers or processing systems included in such processing layers with each layer mapping context information available in the respective layer. Staggering may include contextualization of asset or process specific data on different levels adding context information on single plant level and/or on multi plant level. In the layered system architecture context information available in one layer may be mapped to data provided by the lower layer or processing system. Here lower means closer to the chemical plant data access. For example, the process or asset specific data provided by the first processing layer may include context information on the asset level. In other words, the first processing layer may be configured to provide the process or asset specific data including context information on the asset level. Such context information may relate to real time information such as a measurement value, measurement quality, product quality, batch related data, or measurement time. Context information on asset level may further relate to asset specific information such as an asset identifier, intralogistics or measurement unit identifier. The intermediate system and the process management system may be configured to add further context information to or to contextualize such process or asset specific data. Such context information may relate to the plant level rather than the asset level. Context information for instance relates to plant context such as plant identifier, plant type, reliability indicator, alarm limits, or application context such as model identifier, third party exchange identifier, confidentiality identifier. This way the data quality can be enhanced to maximize context and with that data management and the resulting monitoring and/or controlling capabilities via process applications.

In a further aspect the intermediate processing system is configured to contextualize data by mapping the heterogenous process or asset specific data to a homogeneous data format on plant level. In this context heterogeneous refers to data that relates to the asset level or multiple assets individually, while homogeneous data refers to data that relates to a combination or equal types of assets in a plant. The intermediate processing system may be configured to provide such plant specific data to the process management system. The process management system may further be configured to contextualize the plant specific data provided by the intermediate processing system preferably on multi plant level. Such contextualization may include adding context information on a multiple plant level or on a site level such as multi plant or site context including technical asset structure of one or multiple plant(s) or asset management information such as asset network. Additionally or alternatively such contextualization may include adding application context such as model identifier, third party exchange identifier or a confidentiality identifier.

Additionally or alternatively, the first processing layer may be configured to provide asset or process specific data to the second processing layer. Such data may be provided directly or indirectly to the second processing layer. The second processing layer may be associated with one or more plant(s). The second processing layer may include a process management system and optionally an intermediate processing layer. The first processing layer may include plant-specific core process systems. The core process system(s) may be communicatively coupled to the process management system optionally via the intermediate processing layer. The second processing layer, in particular the process management system, and the external processing layer may be configured to contextualize, store or aggregate data from one or more chemical plant(s) and/or to orchestrate process models for one or more chemical plant(s).

In a further aspect the intermediate processing system is configured to contextualize data by mapping the heterogenous process or asset specific data to a homogeneous data format on plant level. In this context heterogeneous refers to data that relates to the asset level or multiple assets individually, while homogeneous data refers to data that relates to a combination or equal types of assets in a plant. The intermediate processing system may be configured to provide such plant specific data to the process management system. The process management system may further be configured to contextualize the plant specific data provided by the intermediate processing system preferably on multi plant level. Such contextualization may include adding context information on a multiple plant level or on a site level such as multi plant or site context including technical asset structure of one or multiple plant(s) or asset management information such as asset network. Additionally or alternatively such contextualization may include adding application context such as model identifier, third party exchange identifier or a confidentiality identifier.

The second processing layer, preferably the process management system, may be communicatively coupled to an external processing layer via an external network. The second processing layer, preferably the process management system, may be configured to manage data transfer to and/or from the external processing layer in real time or on demand.

The second processing layer, preferably the process management system, may for instance be configured to provide plant specific data to the interface to the external network based on an identifier added by way of contextualization. Such identifier may be a confidentiality identifier based on which such data is not provided to the interface to the external network.

The external processing layer may be a computing or cloud environment providing virtualized computing resources, like data storage and computing power. The external processing layer may provide a private, hybrid, public, community or multi cloud environment. Cloud environments are advantageous, since they provide on demand storage and computing power. Additionally, in cases where multiple chemical plants operated by different parties are to be monitored and/or controlled, data or process applications affecting the chemical plants may be shared in such cloud environment.

In a further aspect the second processing layer, preferably the process management system, is configured to provide plant specific data from one or more chemical plant(s) to the external processing layer. The second processing layer, preferably the process management system, may be further configured to delete at least parts of the data transferred to the external processing layer. The external processing layer may be configured to store historical data from one or more chemical plant(s). The external processing layer may be configured to aggregate, store or contextualize plant specific data from more than one chemical plant and/or to store historical data from more than one chemical plant. Here aggregation means the grouping of data via an aggregate function like a sum, an average or a mode. Aggregation hence relates to a function that reduces dimension or storage space. This way data storage can be externalized, and the required on-premise storage capacities can be reduced plus history transfer is made redundant. Furthermore, owing to the flexible computing and storage resources of the external processing layer and the fact that the data is available in the external processing layer, process applications can be built, trained, tested, or modified in the external processing layer.

In a further aspect the second processing layer, preferably the process management system, is configured to manage data transfer to and/or from the external processing layer in real-time or on demand. Real-time transfer may be buffered depending on network and computing loads on the interface to the external network. On demand transfer may be triggered in a predefined or dynamic manner. Preferred the data transfer to the external processing layer is managed in real-time and the transfer from the external processing layer is managed on demand.

In a further aspect the second processing layer, preferably the process management system, is configured to store or to manage access to historical data, real-time data and planning data. In a further aspect the second processing layer, preferably the process management system, is configured to store or to manage access to historical data for a first time window and the external processing layer is configured to store historical data for a second time window, wherein the first time window is shorter than the second time window. Here the first time window may correspond to a critical time window allowing the system to monitor and/or control the chemical plant in island mode without external network connection. The first time window may be viewed as a hot window, for which historical data is required to safely control and/or monitor the chemical plant. The first time window or hot window may be determined based on storage capacity of the second processing layer, preferably the process management system, or preferably by the process applications and the historical data required to execute on the process applications in island mode without external network connection. This way availability of the system for monitoring and/or controlling is always guaranteed.

In a further aspect deployment is managed by an orchestration application that manages deployment of containerized applications based on the input data, the load indicator, or the system layer tag. Additionally or alternatively the orchestration application is hosted by the second processing layer and/or the external processing layer. In a further aspect the orchestration application hosted by the second processing layer on execution manages critical containerized applications. Additionally or alternatively the orchestration application hosted by the external processing layer on execution manages non-critical containerized applications. Such management on execution may be assigned statically or dynamically. In a dynamic scenario, the second processing layer may host a back-up of critical containerized applications, and the orchestration application hosted by the second processing system may access such back-up, if external network connectivity is disrupted. Here critical containerized applications refer to those containerized applications monitoring an/or controlling critical assets. Such applications are hence required, if the monitoring and/or controlling needs to run in island mode.

In a further aspect the management of critical containerized applications is assigned to the second processing layer based on a history criterion reflecting a time window of available historical data on the first or second processing layer. The second processing layer may be configured to store historical aggregated data for a first time window and the external processing layer may be configured to store historical aggregated data for a second time window, wherein the first time window is shorter than the first time window. In a preferred embodiment the first time window is chosen such that critical containerized applications may be executed on the first or second processing layer. In a further aspect the containerized application is deployed to execute on the second processing layer or the external management layer depending on a history criterion reflecting a time window of available historical data. In such embodiments the application may be executed in the level such data is available. Hence no further data transfer between processing layers is required reducing communication and processing loads. In combination with the contextualization concept staggered across layers processing of plant specific data on the first processing layer would introduce redundant data transfers, once from the first processing layer to the second for contextualization and back to the first processing layer for application execution.

Deployment may depend on the input data. In a further aspect the assignment of deployment layer depends on a data availability indicator, a criticality indicator or a latency indicator.

The data availability indicator may relate to the input data ingested by the containerized application. Based on such indicator execution may be assigned to deployment layers where the data is directly available or stored. For instance the first processing layer may be configured to provide asset or process specific data and the second processing layer may be configured to provide plant specific data. A containerized application ingesting asset or process specific data may be deployed on the first processing layer. Similarly a containerized application ingesting plant specific data may be deployed on the second processing layer. Applications may be executed in the processing layer that hosts the data to avoid redundant data transfers and reduce loads.

The criticality indicator may be a static or a dynamic indicator. In case of a static indicator criticality of an asset, an asset group or a plant may be pre-defined. In case of a dynamic indicator criticality indicator may be assigned dynamically depending on the output data of previous applications runs or other application runs. For instance, the criticality indicator may be determined based on key performance parameters of an asset such as its health status. If the health status of an asset becomes critical over time, the criticality criterion may be changed, and the containerized application may as a result of such change be run in a different deployment layer allowing for reduced latency on e.g. data transfer. In an example the containerized application ingests asset or process specific data of a specific asset and the criticality indicator signifies to be fulfilled, if execution is assigned to the second processing layer rather than the first processing layer. If the health status of the specific asset changes and closer monitoring e.g. at higher frequency may be required, the criticality indicator may be reset signifying the criticality indicator not being fulfilled, if execution is assigned to the second processing layer. In such case the application may be assigned to the first processing layer.

The latency indicator may be a static or a dynamic indicator. In case of a static indicator latency requirements of an asset, an asset group, part of a plant or a plant may be pre-defined. In case of a dynamic indicator latency requirements may be assigned dynamically dependent on signatures of the input data. Such signatures may relate to a frequency of change in real-time measurement data as e.g. derived from historical real-time measurement data. In an example a monitoring signal of a pump may show higher frequencies than a monitoring signal of a heat exchanger. In such a case the containerized application monitoring the pump may be deployed on the asset level either directly on the pump controller or on the core process system of the respective plant. For e.g. the pump the respective containerized application may be deployed in a processing layer as close to the pump as possible to reduce latency. The latency criterion may hence signify the time criticality of the containerized application.

The load indicator may be based on processing and/or network loads of the respective deployment layers. Additionally or alternatively applications may be executed on the deployment layer that provides sufficient computing and storage resources to reduce the processing load on other processing layers and ensure critical application execution is not impacted. In such cases the input data may be transferred to the respective deployment layer. This is particularly advantageous for applications requiring high computing load or less time critical and hence allowing for data transfer latency.

In a further aspect the deployment may depend on a system layer tag that is associated with the containerized application. The system layer tag may be a configuration in the orchestration application, that e.g. deploys, executes and monitors the containerized application. In such case the containerized application may include an application identifier, which the orchestration application may use for identification on deployment. This way the deployment may be "hard wired" to ensure critical applications are executed in the right layer. Such deployment scheme may be particularly relevant to containerized applications monitoring and/or controlling critical assets. In this context critical assets are those, which when disrupted critically impact plant operation. Here the plant specific data refers to contextualized asset or process specific data.

In a further aspect the containerized application is deployed to multiple assets or plants of the same type. Assets of the same type may relate to assets with similar functionalities, from the same supplier and/or with similar characteristics, e.g. performance characteristics. Plants of the same type may relate to plants producing the similar intermediate or end product, having a similar physical asset structure or based on similar chemical processes. Here similar means comparable in the sense that the behavior of the assets or plant show behavior that does not deviate by more than an error tolerance or can be modelled by a single model. Preferably the containerized application is associated with an asset or plant identifier. Such identifier may be a configuration setting of the orchestration application or the containerized application. The plant or asset identifier may be one dimensional signifying one plant or asset type or multi-dimensional signifying multiple plants or assets, for which the containerized application is to be executed. In particular if the first processing layer is with different processing units plant or even asset or process specific such asset identifier allows to address assets associated with different processing units at the same time allowing for highly efficient deployment of containerized applications.

In a further aspect the containerized application is modified based on the input data and the output data of containerized applications executed for multiple assets or plants of the same type. This may be done regularly at per-defined times or dynamically. By aggregating such data the containerized application and particularly plant or asset models may be validated or improved in accuracy. This way the models can be adapted to reflect the behavior of physical plants or assets. This is particularly important for maintenance cycle or life cycle, since the physical plants or assets may shift their behavior depending on the stage during such cycles. Such shifts may be compensated automated and self-optimized by the proposed system.

In a further aspect the containerized application is monitored based on a confidence level of the input data, the asset model or the plant model. The containerized application may provide such confidence levels as output data. Respective operations may be embedded into the containerized application via the asset or plant models or via separate models. A confidence level on the input data may be generated by analyzing e.g. patterns in real-time measurement data. A confidence on the asset or plant model may be generated as part of the execution of the model operation based on input data.

In a further aspect an event signal is triggered, if the confidence level falls below a confidence a threshold, e.g. if confidence is below 70%, 80% or 90%. Such event signal may indicate a failure of an asset or an operation of the application. If an anomalous pattern is detected on the input data and the respective confidence level falls below a threshold application execution may be stopped and a failure signal may be passed to a controlling instance, e.g. on the first processing layer of the chemical plant. Additionally or alternatively such failure signal may be passed to a monitoring instance, e.g. on the first or second processing layer or to a client application e.g. for display to an operator. This way sensor failures and the need to retro-fit may be detected.

In a further aspect modification of the asset or plant model is triggered, if the confidence level exceeds a threshold. Modification may be triggered automatically. Such modification may include hardware or software modifications. Modifications for instance include re-training of the asset or plant model based on historical data, adaption of the input data channel, adaption of the scenario matrix or triggering an event signal to maintain a hardware such as an Internet of Things (IoT) device.

In a further aspect the modification of the asset or plant model is performed on the second processing layer, particularly the process management system, or the external processing layer. Since such modifications do not interfere with the containerized application in the first place, it may be computed on the external processing layer reducing processing loads on monitoring and/or controlling on more critical processing layers, such as the first and second processing layers.

In a further aspect an external containerized application from a third-party environment is provided and deployed to execute on the external processing layer. Applications from third-party environment means any application that was not created in the proprietary system of first processing layer, second processing layer and external processing layer. This way the risk of third party containerized applications infecting the monitoring and/or control system of chemical plants is reduced.

In a further aspect creation of a new containerized application is performed in the external processing layer. E.g. asset or plant models may be trained on the external processing layer. Preferably the external processing layer is configured to store aggregated data for more than one chemical plant. The second processing layer may be configured to provide aggregated data from one or more chemical plant(s) to the external processing layer. The second processing layer may be configured to transfer aggregated data to the external processing layer in real-time or on demand. The second processing layer may be configured to delete at least parts of the data transferred to the external processing layer.

BRIEF DESCRIPTION OF THE DRAWINGS

Example embodiments of the present disclosure are illustrated in the appended drawings. It is to be noted, however, that the appended drawings illustrate only particular embodiments of the present disclosure and are therefore not to be considered limiting of its scope. The technical teaching may encompass other equally effective embodiments.

DETAILED DESCRIPTION

Figure 1:
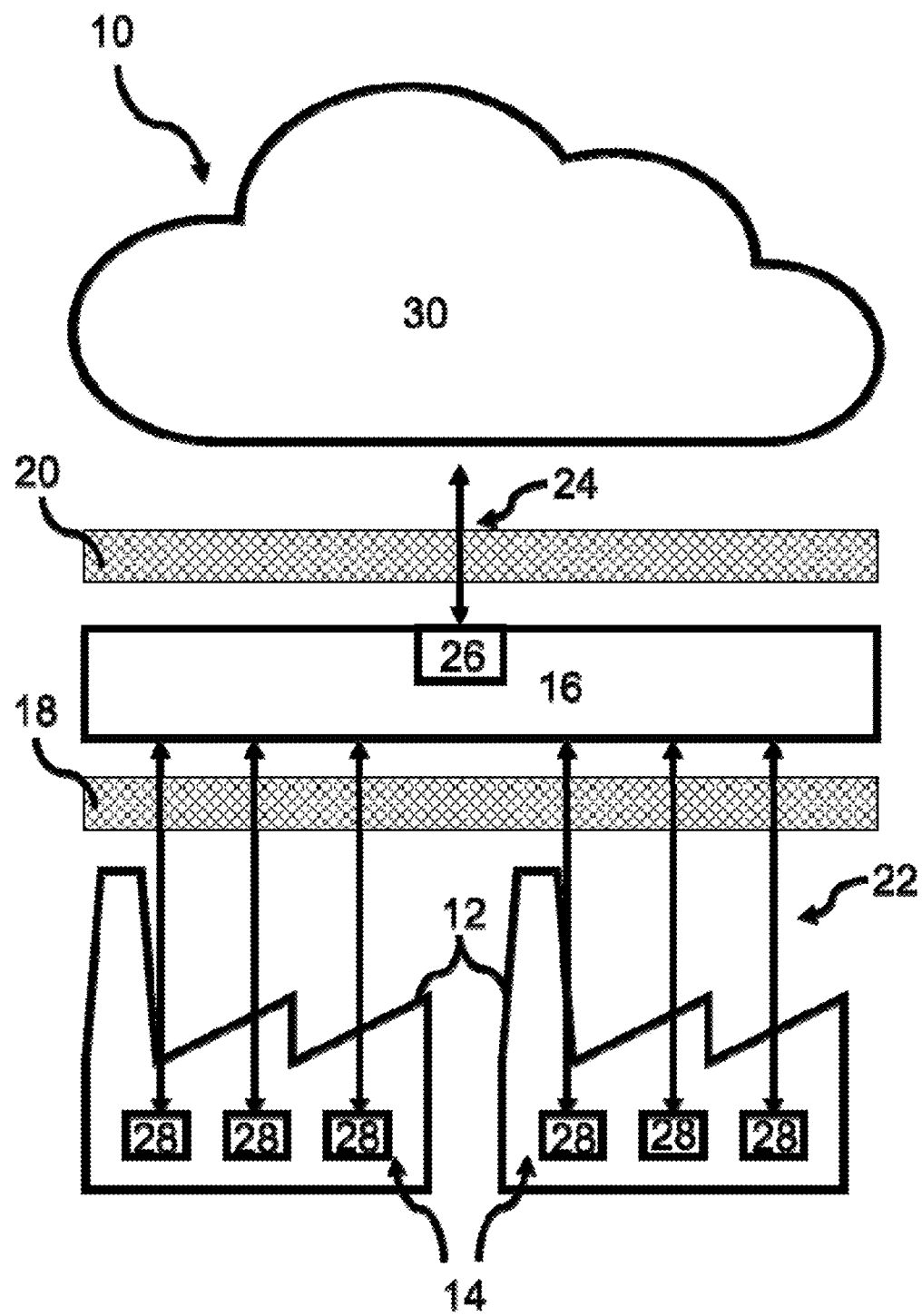
FIG. 1 shows a first schematic representation of the system for monitoring and/or controlling one or more chemical plant(s).

In petrochemicals process industrial production typically starts with upstream products, which are used to derive further downstream products. To date the value chain production via various intermediate products to an end product is highly restrictive and based on siloed infrastructure. This hampers introduction of new technologies such as IoT, cloud computing and big data analytics.

Unlike other manufacturing industries, process industry is subject to very high standards in particular with regard to availability and security. For this reason, computing infrastructures are typically unidirectional and siloed with highly restrictive access to monitoring and control systems of chemical plants.

In general chemical production plants are embedded in an enterprise architecture in a siloed way with different levels to make a functional separation between operational technology and information technology solutions.

Level 0 relates to the physical processes and defines the actual physical processes in the plant. Level 1 relates to intelligent devices for sensing and manipulating the physical processes, e.g. via process sensors, analyzers, actuators and related instrumentation. Level 2 relates to control systems for supervising, monitoring and controlling the physical processes. Real-time controls and software; DCS, human-machine interface (HMI); supervisory and data acquisition (SCADA) software are typical components. Level 3 relates to manufacturing operations systems for managing production work flow to produce the desired products. Batch management; manufacturing execution/operations management systems (MES/MOMS); laboratory, maintenance and plant performance management systems, data historians and related middleware are typical components. Time frames for controlling and monitoring may be shifts, hours, minutes, seconds. Level 4 relates to business logistics systems for managing the business-related activities of the manufacturing operation. ERP is the primary system and establishes the basic plant production schedule, material use, shipping and inventory levels. Time frame may be months, weeks, days, shifts.

Additionally, such structures adhere to strict one-way communication protocols allowing for no data flow into level 2 or below. Not covered in such architectures is the company or enterprise-external internet. The model remains, however, an essential concept within the realm of Cyber Security. Within this context, the challenge is to leverage the benefits of Cloud computing and Big Data, while still guaranteeing the established advantages of existing architectures: i.e. the high availability and reliability of the lower levels system (Level 1 and Level 2), that control the chemical plant, as well as the cyber security.

The technical teaching presented here allows for enhancing monitoring and/or control changing this framework in a systematic way, to introduce new capabilities that are compatible with existing architectures. The present disclosure specifically relates to a highly scalable, flexible and available computing infrastructure for process industry, which at the same time adheres to the high security standards.

FIG. 1 shows a first schematic representation of the system 10 for monitoring and/or controlling chemical plants 12.

The system 10 comprises two processing layers including the first processing layer in the form of a core process system 14 associated with each of the chemical plants 12 and the second processing layer 16, e.g. in the form of a process management system, associated with two chemical plants 12. The core process system 14 is communicatively coupled to the second processing layer 16 allowing for unidirectional or bidirectional data transfer. The core process system 14 comprises a decentralized set of processing units associated with assets of the chemical plant 12.

The core process system 14 and the second processing layer 16 are configured in the secure network 18, 20, which in the schematic representation includes two security zones. The first security zone is situated on the core process system 14 level, where the first firewall 18 controls incoming and outgoing network traffic to and from the core process system 14. The second security zone is situated on the second processing layer 16, where the second firewall 20 controls incoming and outgoing network traffic to and from the second processing layer 16. Such segregated network architecture allows to shield vulnerable plant operations from cyberattacks.

The core process system 14 provides process or asset or process specific data 22 of the chemical plant 12 to the second processing layer 16. The second processing layer 16 is configured to contextualize the process or asset or process specific data of the chemical plants 12. The second processing layer 16 is further configured to provide plant specific data 24 of the chemical plants 12 to the interface 26 to the external network. Here the plant specific data may refer to contextualized process or asset or process specific data.

Process or asset or process specific data may include value, quality, time, measurement unit, asset identifier. Via contextualization further context such as plant identifier, plant type, reliability indicator, or alarm limits for the plant may be added. In a further step technical asset structure of one or multiple plant(s) or a site and other asset management (e.g. asset network), plus application context (e.g. model identifier, third party exchange) may be added.

The second processing layer 16 is communicatively coupled to an external processing layer 30 via interface 26 to the external network. The external processing layer 30 may be a computing or cloud environment providing virtualized computing resources, like data storage and computing power. The second processing layer 16 is configured to provide plant specific data 24 from one or more chemical plants 12 to the external processing layer 30. Such data may be provided in real time or on demand. The second processing layer 16 is configured to manage data transfer to and/or from the external processing layer in real-time or on demand. The second processing layer 16 may for instance provide plant specific data 24 to the interface 26 to the external network based on an identifier added by way of contextualization. Such identifier may be a confidentiality identifier based on which such data is not provided to the interface 26 to the external network. The second processing layer 16 may be further configured to delete at least parts of the data transferred to the external processing layer 30.

The external processing layer 30 is configured to aggregate plant specific data from more than one chemical plant and/or to store historical data from more than one chemical plant. This way data storage can be externalized, and the required on-premise storage capacities can be reduced plus history transfer is made redundant. Additionally, such storage concept allows to store historical data on the second processing layer 16 for a hot window, which is a critical time window allowing the system 10 to monitor and/or control the chemical plant in island mode without external network connection. This way availability of the system 10 for monitoring and/or controlling is always guaranteed.

The second processing layer 16 and the external processing layer 30 are configured to host and/or orchestrate process applications. In particular the second processing layer 16 may host and/or orchestrate process applications relating to core plant operations and the external processing layer 30 may be configured to host and/or orchestrate process applications relating to non-core plant operations.

Furthermore, the second processing layer 16 and the external processing layer 30 may be configured to exchange data with 3rd party management systems, e.g. via integration of 3rd party external processing layer, to orchestrate data visualization, to orchestrate computing process workflows, to orchestrate data calculations, to orchestrate APIs to access data, to orchestrate metadata of data storage, transfer and calculation, to provide interactive plant data working environment for users, e.g. operators and to verify and improve data quality.

Figure 2:
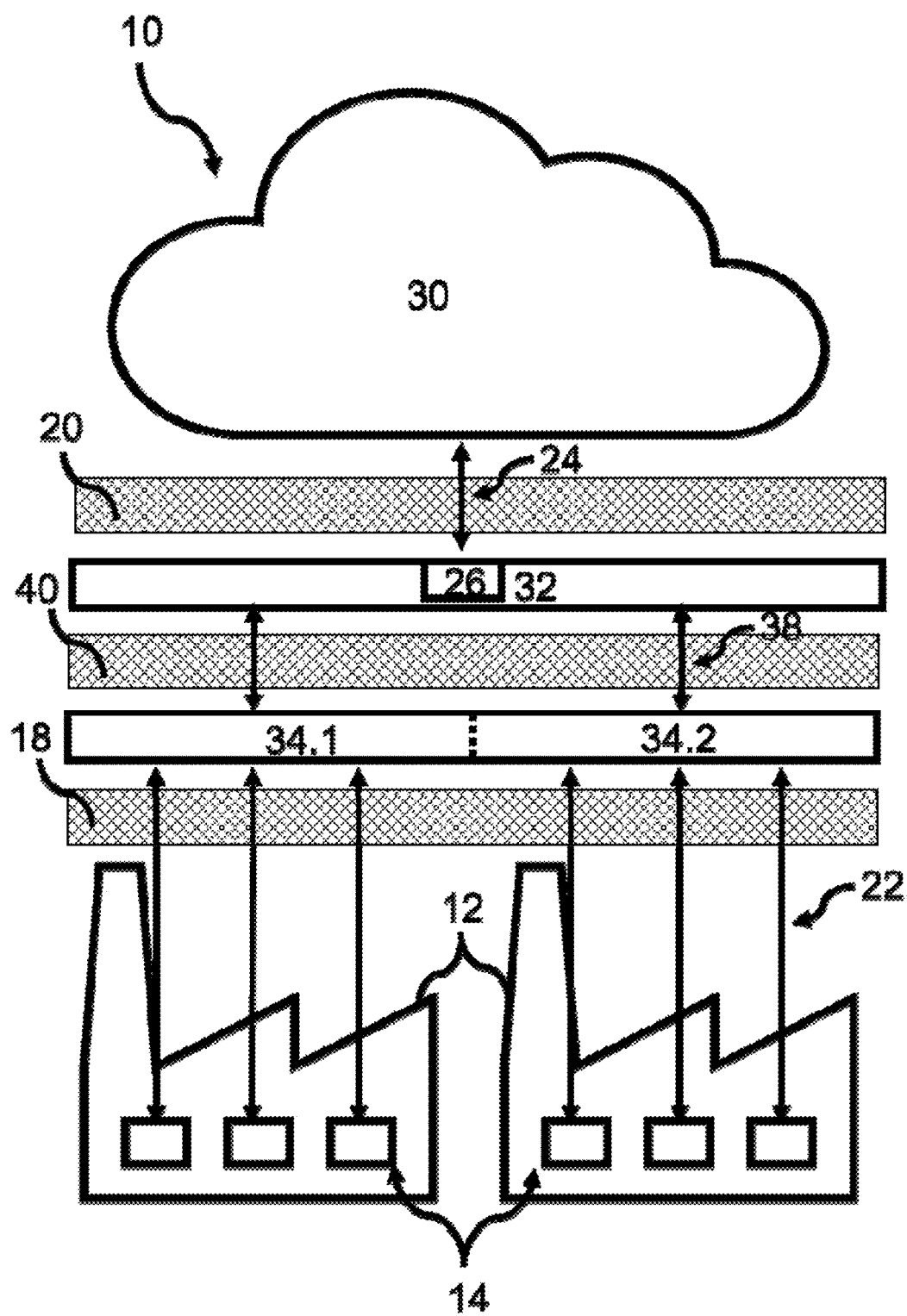
FIG. 2 shows a second schematic representation of the system for monitoring and/or controlling one or more chemical plant(s).

FIG. 2 shows a second schematic representation of the system 10 for monitoring and/or controlling one or more chemical plant(s) 12.

The system 10 shown in FIG. 2 is similar to the system shown in FIG. 1. However, the system of FIG. 2 has a second processing layer with a process management system 32 and an intermediate processing system 34. The intermediate processing systems 34.1, 34.2 is configured in a security zone of the secure network via firewall 40.

The intermediate processing systems 34.1, 34.2 may be configured to ingest process or asset or process specific data 22 from individual or multiple chemical plants 12. Such data is contextualized on a plant level in intermediate processing system 34.1, 34.2 and plant specific data 38 may be provided to the process management system 32, where further contextualization e.g. across plant levels on Verbund or site level may be performed. In this setup the data contextualization is staggered across the different system 10 layers with each layer 14, 34, 32 mapping context information available in the respective layer 14, 34, 32.

Figure 3:
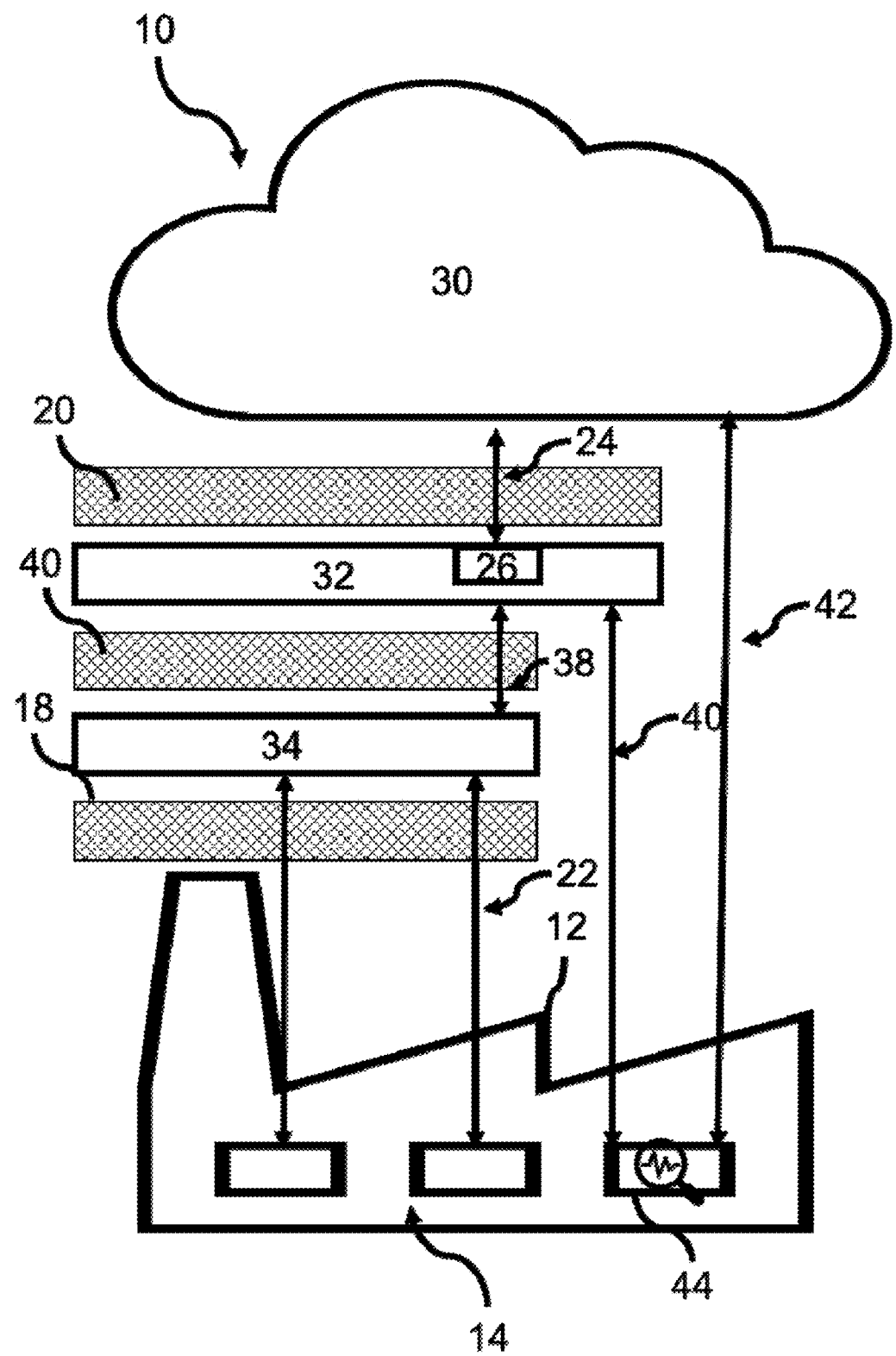
FIG. 3 shows a third schematic representation of the system for monitoring and/or controlling one or more chemical plant(s).

FIG. 3 shows a third schematic representation of the system 10 for monitoring and/or controlling one or more chemical plant(s) 12.

The system 10 shown in FIG. 3 is similar to the systems shown in FIGS. 1 and 2. However, the system of FIG. 3 includes monitoring devices 44, which are communicatively coupled to the process management system 32 or the external processing layer 30. The monitoring device 36 may be configured to transfer monitoring data to process management system 32 or the external processing layer 30. The process management system 32 or the external processing layer 30 may be configured to manage multiple monitoring devices 44. Since such IoT devices are not considered reliable, monitoring data provided by the monitoring device 44 may be tagged unidirectional, and any control loop relating to the chemical plant 12 may include a filter for such tag. Thus, such data will not be used for any control of the chemical plant 12.

Figure 4:
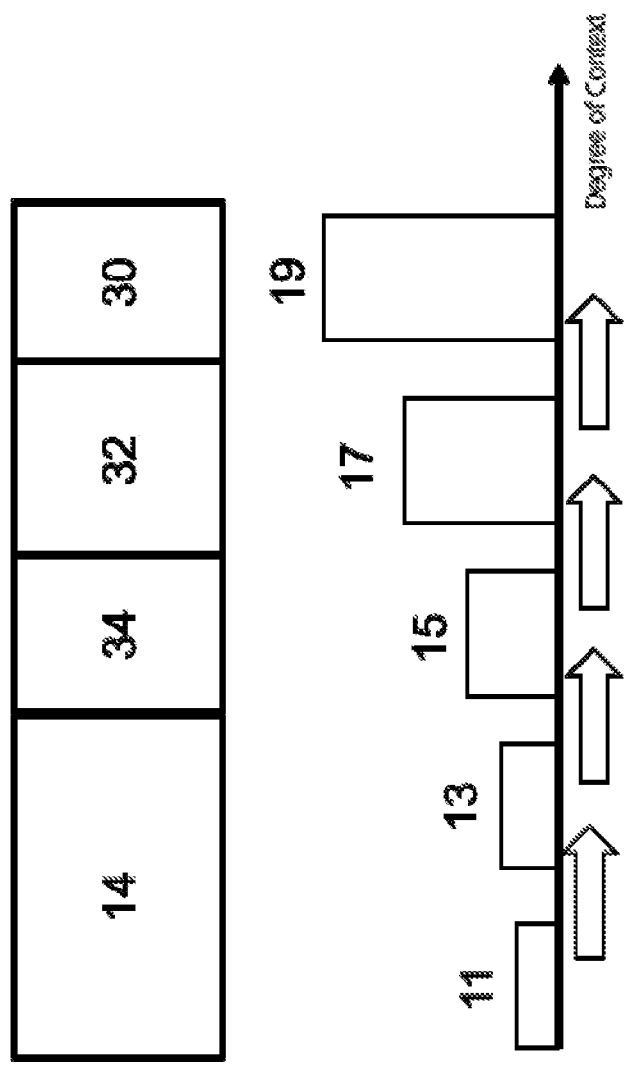
FIG. 4 shows a schematic representation of the data contextualization concept in systems like those shown in FIGS. 1 to 3.

FIG. 4 shows a schematic representation of the data contextualization concept in systems 10 like those shown in FIGS. 1 to 3.

The systems 10 of FIGS. 1 to 3 include two internal processing layers 14, 16, 32, 34 and the external processing layer 30. The first processing layer 14 may be a decentralized control system for supervising, monitoring and controlling the physical processes in the chemical plant 12. The first processing layer 14 may be configured to provide process or asset or process specific data. The second processing layer 16, 32, 34 may include the intermediate processing system 34 and the process management system 32. The intermediate processing system 34 may be configured as an edge computing layer. Such layer may be associated to Level 3 for individual plants. The intermediate processing system 34 may be configured for collecting process or asset or process specific data,
interaction with basic automation systems from Level 2,
initial contextualization (bottom-up approach), wherein context is added based on what is known on Level 2 and Level 1 and within the decentralized edge device, The process management system 32 may be configured as centralized edge computing layer. Such layer may be associated to Level 4 for multiple plants. The process management system 32 may be configured for:

integration of data from different decentralized edge devices including the intermediate processing system 34 or monitoring devices 44,
further contextualization (bottom-up approach), wherein additional context is added based on preprocessed context in the decentralized within the decentralized edge devices.

The external processing layer 30 may be configured as centralized cloud computing platform. Such platform may be associated with Level 5 for multiple plants. The external processing layer 30 may be configured as manufacturing data workspace with full data integration across multiple plants including manufacturing data history transport & streaming, collection of all data from all edge components. This way the full contextualization of all lower level context may be integrated in the on the external processing layer 30 for multiple plants. Thus, the external processing layer 30 may be further configured to run cloud-native apps,
connect with external PaaS and SaaS tenants,
integrate machine learning with manufacturing data & processes, train-test-deploy,
visualize data, access apps, orchestrate.

By way of system architecture, a bottom-up contextualization concept may be realized. Such concept is shown in FIG. 4. In the bottom-up concept all information that is available on the lower-levels may already be added to the data as attributes, such that lower level context is not lost. Here the first processing layer 14 as the lowest context level may include measurement values 11, which are contextualized with respect to the item 13 the measurement was conducted with. The intermediate processing system 34 may further contextualize by adding further tags 15 relating to the individual chemical plant 12. The process management system 32 may further contextualize by adding tags 17 relating to multiple chemical plants 12 and/or business information. The external processing layer 30 may further contextualize by adding tags 19 relating to multiple plants and/or external context information, e.g. from third parties.

The contextualization concept may cover at least two fundamental types of context. One type may be the functional location within the production environment comprising multiple chemical plants. This may cover information about what and where this data point represents inside the production environment. Examples are the connection with a functional location, an attribute with respect to which physical asset the data is collected, etc. This context may be beneficially used for later applications, since it explains which data is available for which plants and assets.

Another type may be confidentiality categorization. Such tag may be added on the lowest level possible and this information may be propagated to further processing layers. Such tag may be added automatically or manually. With technical measures e.g. via a filter embedded into the firewalls, it may be prohibited automatically, that "strictly confidential" data is integrated all the way up to the external processing layer 30. Sharing of data with externals will lead to an automatic notification that "confidential data" is being shared. An automatic contractual check may be implemented to see whether this data can be shared with this external.

Overall the contextualization concept realized in such way allows for highly efficient data usage in process applications deployed on any layer of the system.

Figure 5:
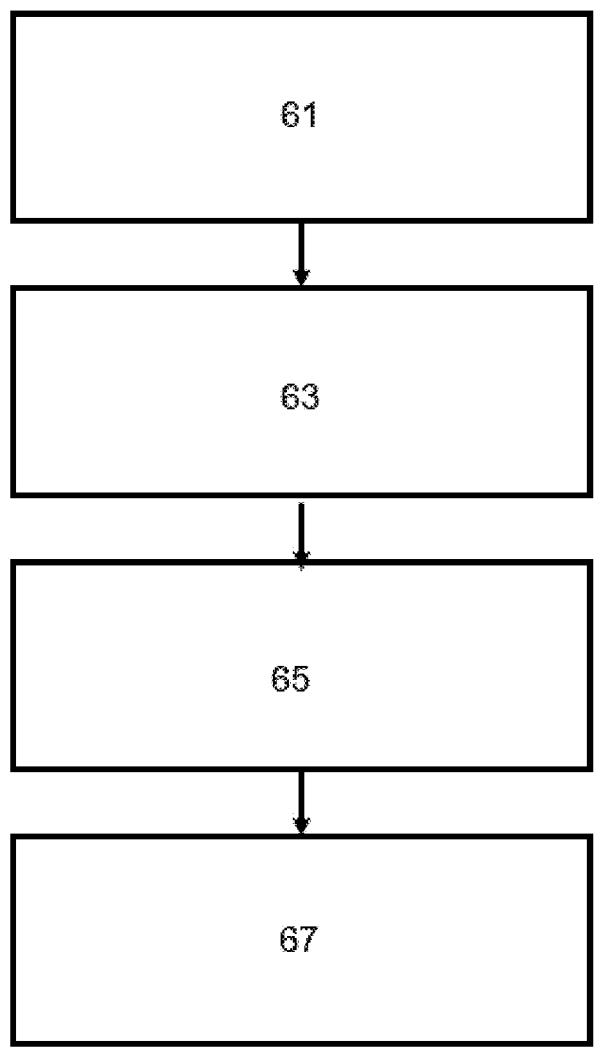
FIG. 5 shows a flowchart in a schematic representation of the method for monitoring and/or controlling one or more chemical plant(s).

FIG. 5 shows a flowchart in a schematic representation of the method for monitoring and/or controlling one or more chemical plant(s).

Preferably the method is performed on a distributed computing system as shown in FIGS. 1 to 3 comprising a first processing layer 14 associated with the chemical plant 12 and communicatively coupled to a second processing layer 16, 32, 34. The method may perform all steps as described in the context of FIG. 1 to 4, including any steps relating to contextualization, data handling, process application management and monitoring device management.

In a first step, 61, process or asset or process specific data of the chemical plant 12 is provided via the first processing layer 14 to the second processing layer 16, 32, 34.

In a second step 63, process or asset or process specific data is contextualized via the second processing layer 16, 32, 34 to generate plant specific data.

In a third step, 65, plant specific data of one or more chemical plant(s) 12 is provided via the second processing layer 16, 32, 34 to the interface 26 to the external network.

In a fourth step, 67, one or more chemical plant(s) are monitored and/or controlled via the second processing layer 16, 32, 34 or the first processing layer 14 based on the process or asset or process specific data or the plant specific data. Monitoring and/or controlling of the one or more chemical plant(s) 12 may be conducted via the second processing layer 16, 32, 34 or the external processing layer 30 based on the plant specific data. Additionally, monitoring and/or controlling may be conducted via the first processing layer 14 based on the process or asset or process specific data. Such monitoring and/or controlling may be performed through process applications ingesting respective data and providing monitoring and/or controlling output as further lined out in FIGS. 6 to 8.

Figure 6:
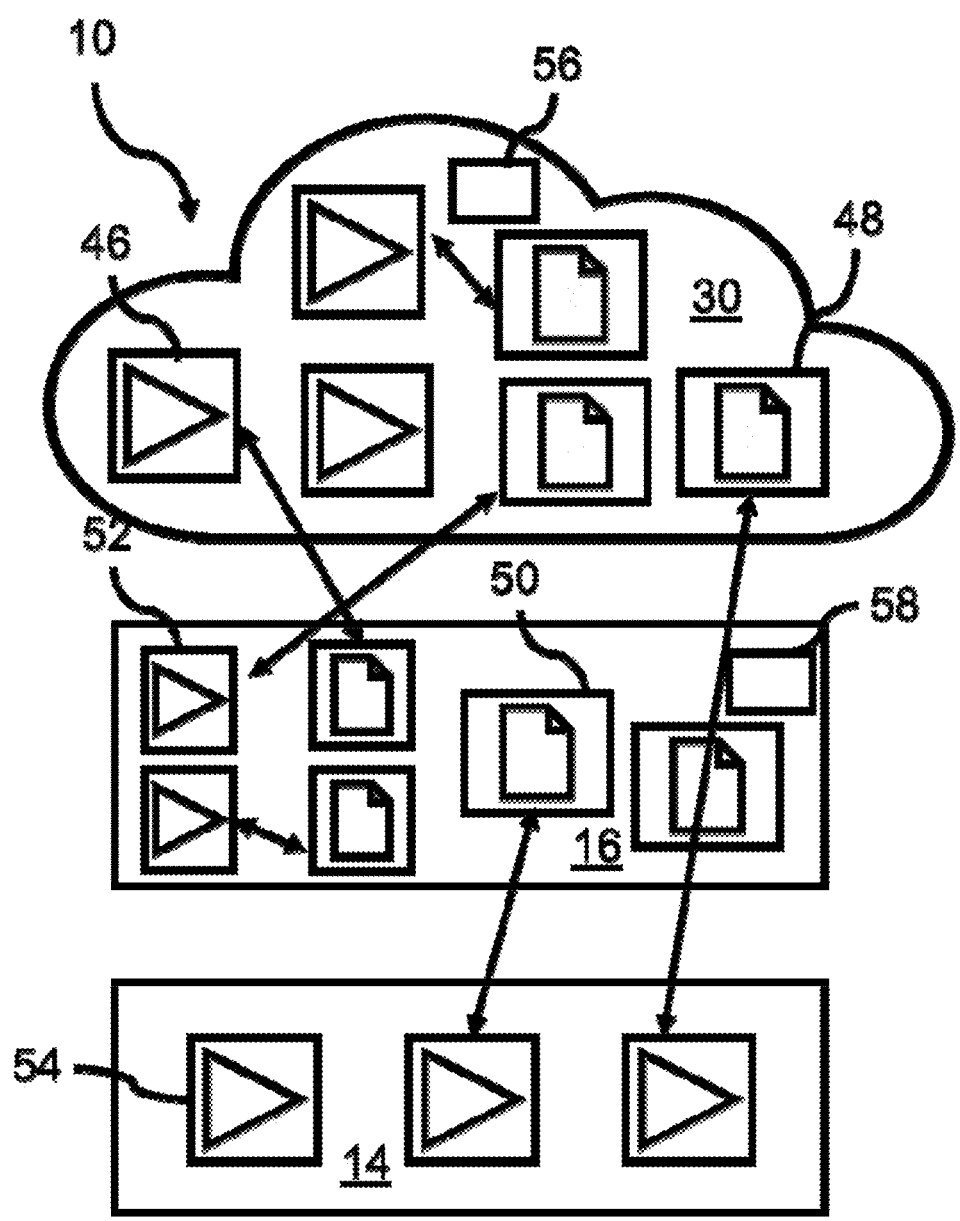
FIG. 6 shows a schematic representation of systems for monitoring and/or controlling one or more chemical plant(s) via containerized applications.

FIG. 6 shows a schematic representation of the distributed computing system for monitoring and/or controlling one or more chemical plant(s) with multiple assets via a distributed computing system 10 with more than two deployment layers 14, 16, 30.

The schematic of FIG. 6 represents containerized application orchestration in different deployment layers 14, 16, 30. The system 10 includes an external processing system 30, a second processing layer 16 and a first processing layer 14. Here the second processing layer 16 may include larger storage and computing resources than the first processing layer 14, and/or the external processing layer 30 may include larger storage and computing resources than the second processing layer 16. The system's 10 architecture and functionalities may adhere to the architectures and functionalities described with respect to FIGS. 1 to 3. In particular the first and the second processing layer 14, 16 may be configured in a secure network 20, 40, 18. The first processing layer 14 may be communicatively coupled to the second processing layer 16 and the second processing layer 16 may be communicatively coupled to the external processing layer 30 via an external network 24.

The orchestration applications 56, 58 may be hosted by the external processing layer 30 and the second processing layer 16, 32, 34 respectively. Hence containerized applications or container images 48, 50 may be stored in a registry of the external processing layer 30 and the second processing layer 16, 32, 34 respectively. The containerized applications 48, 50 for execution may include one or more operations to ingest input data, to provide the input data to respective asset or plant model(s) generating output data and to provide the generated output data for controlling and/or monitoring the chemical plant 12. This way the external processing layer 30 and the second processing layer 16, 32, 34 act as facilitating layers reducing the computing and storage resources required on the first processing layer 14 on the asset level.

Figure 7:
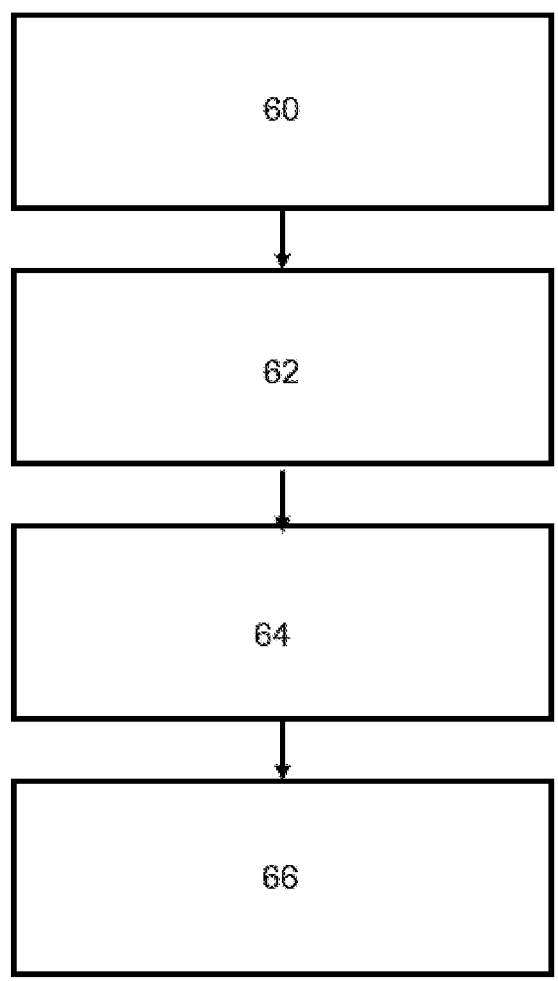
FIG. 7 shows a flowchart in a schematic representation of the method for monitoring and/or controlling a chemical plant with multiple assets.

FIG. 7 shows a flowchart in a schematic representation of the method for monitoring and/or controlling a chemical plant 12 with multiple assets via a distributed computing system 10 as it may be performed in the systems 10 shown in FIGS. 1 to 4.

In a first step 60, the containerized application 48, 50 including an asset or plant template specifying input data, output data and an asset or plant model is provided. The containerized application 48. 50 may be created on the external processing layer 30 or may be modified on the second processing layer 30. An external containerized application from a third party environment may be provided.

In a second step 62, the containerized application 48, 50 is deployed to execute on at least one of the deployment layers 30, 32, 16, 34, 14 wherein the deployment layer 30, 32, 16, 34, 14 is assigned based on the input data, a load indicator, or a system layer tag, and the containerized application 48, 50 may be executed on the assigned deployment layer(s) 30, 32, 16, 34, 14 to generate output data for controlling and/or monitoring the chemical plant 12. Deployment may be managed by an orchestration application 56, 50 that manages deployment of containerized applications 48, 50 based on the input data, the load indicator, or the system layer tag. The orchestration application may be hosted by the second processing layer 16, 23, 34 and/or the external processing layer 30. The orchestration application 56, 58 hosted by the second processing layer 16, 32, 34 manages critical containerized applications 48, 50, wherein the orchestration application 56, 58 hosted by the external processing layer 30 may manage non-critical containerized applications 48, 50. The assignment of the deployment layer 30, 32, 34, 16, 14 may be based on input data depends on a data availability indicator, a criticality indicator or a latency indicator. A containerized application from a third party environment may be deployed to execute on the external processing layer 30.

The orchestration applications 56, 58 may be hosted by the external processing layer 30 and the second processing layer 16 respectively. The orchestration applications 56, 58 may deploy containerized applications 48, 50 on any deployment layer 30, 16, 14. The containerized applications 48, 50 may then be executed on respective deployment layer 30, 16, 14 by running the process applications 46, 52, 54 in a sandbox-type environment. The deployment layer 30, 16, 14 may be assigned based on the input data, the load indicator, or the system layer tag. For instance, management of critical containerized applications 50 may be assigned to the second processing layer 16 optionally based on a history criterion reflecting a time window of available historical data on the first or second processing layer 16. Advantageously the containerized applications 48, 50 may be deployed to multiple assets or plants of the same type. Furthermore, the containerized applications 50, 48 may be modified based on the input data and the output data provided by containerized applications 46, 52, 54 executed for multiple assets or plants of the same type.

In a third step 64 the containerized application 48, 50 may be monitored based on a confidence level of the input data, the asset model or the plant model during or after each execution. Based on the resulting confidence level an event signal or modification of the asset or plant model may be triggered. Such Trigger may be set, if the confidence level exceeds a threshold. Such threshold may be pre-defined or dynamic. If a trigger is set, the modification of the asset or plant model may be performed e.g. on the second processing layer 16, 32, 34 or the external processing layer 30.

In a fourth step 66 the generated output data is provided for controlling and/or monitoring the chemical plant 12. Such output data may be passed to a persistent instance after execution of the containerized application 48, 50. In particular such output data may be passed to a controlling instance, e.g. on the first processing layer 14 of the chemical plant 12. Additionally or alternatively such output data may be passed to a monitoring instance on the first processing layer 14, the second processing layer 16, 32, 34 or the external processing layer 30. The output data may be passed to e.g. a client application for display to an operator or a further containerized application 48, 50 for execution.

Figure 8:
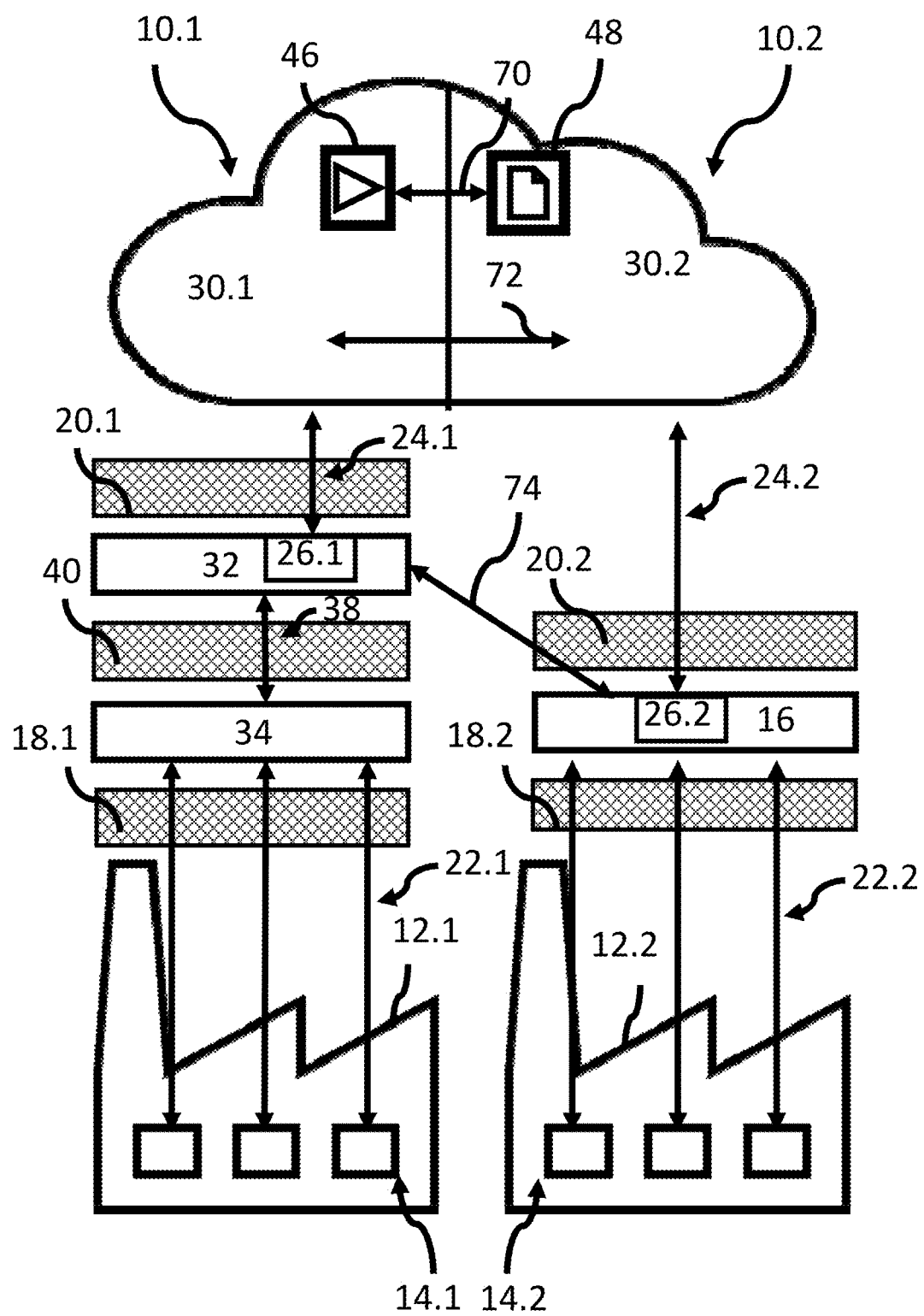
FIG. 8 shows a schematic representation of the system for monitoring and/or controlling more than one chemical plants in different secure networks, which are configured for data and application transfer.

FIG. 8 shows a schematic representation of systems 10.2, 10.2 for monitoring and/or controlling more than one chemical plants 12.1, 12.2 in different secure networks 20.1, 20.2, which are configured for data and process application transfer. FIG. 8 shows systems 10 of FIGS. 1 to 3 including first and second processing layers 14, 16, 32, 34 and the external processing layer 30 as examples. Any other system architecture may be similarly suited for process application and data transfer. Both systems are associated with separate secure networks 20.1, 20.2 and communicatively coupled to an external network 24.1, 24.2 via interfaces 26.1, 26.2.

The systems 10.1, 10.2 are configured to exchange process or asset or process specific data or the process application based on the transfer tag. By adding the transfer tag on the earliest level possible, i.e. where the data or the application is generated or first enters the system, the transfer tag becomes an inherent part of any data point or application as soon as the tag is added and follows the data or application on its path through the system 10.1, 10.2. Such transfer tag enables seamless, but secure integration of external data sources or external applications as well as transfer of data or application to external resources.

In one case shown in FIG. 8 an application 48 is exchanged between the systems 10.1, 10.2. In this example the containerized application 48 is transferred via the external processing layer 30.1, 30.2 communicatively coupled to the two systems 10.1, 10.2. Here the external processing layer 30.1 is communicatively coupled to system 10.1 and the external processing layer 30.2 is communicatively coupled to system 10.2. The exchange of the containerized application 48 is performed indirectly through the external processing layers 30.1, 30.2. The containerized application is tagged with a transfer tag including two transfer settings relating to confidentiality settings and/or third-party transfer settings. This way the transfer may be prohibited based a compliance check on the external processing layer 30.2, e.g. if a transfer with respective third-party identifier is not associated with third party identifier stored in a database of allowed third party transfers for the process application 48. Similarly process or asset or process specific data may be transferred 72 between the systems 10.1, 10.2. Any transfer between the systems 10.1, 10.2 may then be followed by further transfers from the external processing layer 30.1, 30.2 to the respective system 10.1, 10.2.

Additionally, such transfer based on a transfer tag may be conducted directly between the systems 10.1, 10.2 between processing layers 32, 16 associated with the secure networks 20.1, 20.1. Such transfers based on transfer tag may be realized via a secure connection 74 between such layers 16, 23, such as a VPN connection. Any transfer between the systems 10.1, 10.2 may then be followed by further transfers between system components inside the secure networks 20.1, 20.2 or to the external processing layer 30.1, 30.2 of the respective system 10.1, 10.2. By attaching the transfer tag to any data point and process application, containerized or not, allows to securely handle third-party transfers between systems 10.1, 10.2 in separate secure networks 20.1, 20.1.

Any of the components described herein used for implementing the methods described herein may be in a form of a distributed computer system having one or more processing devices capable of executing computer instructions. Components of the computer system may be communicatively coupled (e.g., networked) to other machines in a local area network, a secure network, an intranet, an extranet, or the Internet. Components of the computer system may operate as a peer machines in a peer-to-peer (or distributed) network environment. Parts of the computer system may be a virtualized cloud computing environment, edge gate ways, web appliances, servers, network router, switch or bridge, or any machine capable of executing a set of instructions (sequential or otherwise) that specify actions to be taken by that machine. Further, it is to be understood that the terms "computer system," "machine," "electronic circuitry," and the like are not necessarily limited to a single component, and shall be taken to include any collection of machines that individually or jointly execute a set (or multiple sets) of instructions to perform any one or more of the methodologies discussed herein.

Some or all of the components of such a computer system may be utilized by or illustrative of any of the components of the system 10. In some embodiments, one or more of these components may be distributed among multiple devices or may be consolidated into fewer devices than illustrated. Furthermore, some components may refer to physical components realized in hardware and others may refer to virtual components realized in software on remote hardware.

Any processing layer may include a general-purpose processing device such as a microprocessor, microcontroller, central processing unit, or the like. More particularly, the processing layers may include a CISC (Complex Instruction Set Computing) microprocessor, RISC (Reduced Instruction Set Computing) microprocessor, VLIW (Very Long Instruction Word) microprocessor, or a processor implementing other instruction sets or processors implementing a combination of instruction sets. The processing layer may also include one or more special-purpose processing devices such as an ASIC (Application-Specific Integrated Circuit), an FPGA (Field Programmable Gate Array), a CPLD (Complex Programmable Logic Device), a DSP (Digital Signal Processor), a network processor, or the like. The methods, systems and devices described herein may be implemented as software in a DSP, in a micro-controller, or in any other side-processor or as hardware circuit within an ASIC, CPLD, or FPGA. It is to be understood that the term "processing layer" may also refer to one or more processing devices, such as a distributed system of processing devices located across multiple computer systems (e.g., cloud computing), and is not limited to a single device unless otherwise specified.

Any processing layer may include suitable data storage device like a computer-readable storage medium on which is stored one or more sets of instructions (e.g., software) embodying any one or more of the methodologies or functions described herein. The instructions may also reside, completely or at least partially, within the main memory and/or within the processor during execution thereof by the computer system, main memory, and processing device, which may constitute computer-readable storage media. The instructions may further be transmitted or received over a network via a network interface device.

A computer program for implementing one or more of the embodiments described herein may be stored and/or distributed on a suitable medium, such as an optical storage medium or a solid state medium supplied together with or as part of other hardware, but may also be distributed in other forms, such as via the internet or other wired or wireless telecommunication systems. However, the computer program may also be presented over a network like the World Wide Web and can be downloaded into the working memory of a data processor from such a network.

The terms "computer-readable storage medium," "machine-readable storage medium," and the like should be taken to include a single medium or multiple medium (e.g., a centralized or distributed database, and/or associated caches and servers) that store the one or more sets of instructions. The terms "computer-readable storage medium," "machine-readable storage medium," and the like shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "receiving," "retrieving," "transmitting," "computing," "generating," "adding," "subtracting," "multiplying," "dividing," "selecting," "optimizing," "calibrating," "detecting," "storing," "performing," "analyzing," "determining," "enabling," "identifying," "modifying," "transforming," "applying," "extracting," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It has to be noted that embodiments of the invention are described with reference to different subject matters. In particular, some embodiments are described with reference to method type claims whereas other embodiments are described with reference to the system type claims.

However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or example and not restrictive; the invention is not limited to the disclosed embodiments. Other variations to the disclosed embodiments can be understood and effected by those skilled in the art and practicing the claimed invention, from a study of the drawings, the disclosure, and the appended claims. In some instances, well-known structures and devices are shown in block diagram form, rather than in detail, in order to avoid obscuring the present disclosure.

In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for monitoring and/or controlling a chemical plant with multiple assets via a distributed computing system with more than two deployment layers, wherein the deployment layers comprise at least a first processing layer and a second processing layer wherein the first and the second processing layer are configured inside a secure network, wherein the first processing layer is communicatively coupled to the second processing layer and the second processing layer is communicatively coupled to an external processing layer via an external network, the method comprising:
providing a containerized application including an asset or plant template specifying input data, output data and an asset or plant model,
deploying the containerized application to execute on at least one of the deployment layers, wherein the deployment layer is assigned based on the input data, a load indicator, or a system layer tag, and executing the containerized application on the assigned deployment layer(s) to generate output data for controlling and/or monitoring the chemical plant,
providing the generated output data for controlling and/or monitoring the chemical plant, providing process or asset specific data from the first processing layer to the second processing layer, wherein the process or asset specific data refers to data relating to a specific asset or process and contextualized with respect to such specific asset or process, wherein contextualization of the process or asset specific data relates to context available on the first processing layer, providing plant specific data of one or more chemical plant(s), by the second processing layer, to the external processing layer, wherein the plant specific data refers to process or asset specific data that is contextualized with respect to one or more plant(s), wherein the contextualization of the plant specific data relates to context available on the second processing layer.

2. The method of claim 1, wherein the second processing layer includes larger storage and computing resources than the first processing layer, and/or the external processing layer includes larger storage and computing resources than the second processing layer.

3. The method of claim 1, wherein the containerized application for execution includes one or more operations to ingest input data, to provide the input data to respective asset or plant model(s) generating output data and to provide the generated output data for controlling and/or monitoring the chemical plant.

4. The method of claim 1, wherein the assignment of the deployment layer based on input data depends on a data availability indicator, a criticality indicator or a latency indicator.

5. The method of claim 1, wherein the containerized application is deployed to multiple assets or plants of the same type.

6. The method of claim 1, wherein the containerized application is modified based on the input data and the output data provided by containerized applications executed for multiple assets or plants of the same type.

7. The method of claim 1, wherein an external containerized application from a third-party environment is provided and deployed to execute on the external processing layer.

8. The method of claim 1, wherein deployment is managed by an orchestration application that manages deployment of containerized applications based on the input data, the load indicator, or the system layer tag.

9. The method of claim 8, wherein the orchestration application is hosted by the second processing layer and/or the external processing layer.

10. The method of claim 8, wherein the orchestration application hosted by the second processing layer manages critical containerized applications, wherein the orchestration application hosted by the external processing layer manages non-critical containerized applications.

11. The method of claim 8, wherein the management of critical containerized applications is assigned to the second processing layer based on a history criterion reflecting a time window of available historical data in the first or second processing layer.

12. The method of claim 1, wherein the containerized application is monitored based on a confidence level of the input data, the asset model or the plant model.

13. The method of claim 12, wherein an event signal or a modification of the asset or plant model is triggered, if the confidence level falls below a confidence threshold.

14. The method of claim 12, wherein the modification of the asset or plant model is performed on the second processing layer or the external processing layer.

15. A system configured to monitor and/or control a chemical plant with multiple assets with more than two deployment layers, wherein the deployment layers comprise at least a first processing layer and a second processing layer, wherein the first and the second processing layer are configured inside a secure network, wherein the first processing layer is communicatively coupled to the second processing layer and the second processing layer is communicatively coupled to an external processing layer via an external network, the system being configured to:

provide a containerized application including an asset or plant template specifying input data, output data and an asset or plant model, deploy the containerized application to execute on at least one of the deployment layers, wherein the deployment layer is assigned based on the input data, a load indicator, or a system layer tag, and executing the containerized application on the assigned deployment layer(s) to generate output data for controlling and/or monitoring the chemical plant, provide the generated output data for controlling and/or monitoring the chemical plant, wherein the first processing layer is configured to provide process or asset specific data to the second processing layer, wherein the process or asset specific data refers to data relating to a specific asset or process and contextualized with respect to such specific asset or process, wherein the contextualization of the process or asset specific data relates to context available on the first process layer, and wherein the second processing layer is configured to provide plant specific data of one or more chemical plant(s) to the external processing layer, wherein the plant specific data refers to process or asset specific data that is contextualized with respect to one or more plant(s), wherein the contextualization of the plant specific data relates to context available on the second processing layer.

* * * * *